United States Patent [19]

Brotsky et al.

[11] 4,381,316

[45] Apr. 26, 1983

[54] WHEY PROTEIN FORTIFIED CURED MEAT AND PROCESS FOR PREPARATION

[75] Inventors: Eugene Brotsky, Pittsburgh; Charles W. Everson, McMurray; William E. Swartz, Upper St. Clair, all of Pa.

[73] Assignee: Nutrisearch Company, Cincinnati, Ohio

[21] Appl. No.: 228,655

[22] Filed: Jan. 26, 1981

Related U.S. Application Data

[63] Continuation-in-part of Ser. No. 108,734, Dec. 31, 1979, abandoned.

[51] Int. Cl.$^3$ ............................ A23B 4/00; A23L 1/31
[52] U.S. Cl. ..................................... 426/265; 426/281; 426/641; 426/652; 426/657
[58] Field of Search ............... 426/583, 641, 644, 645, 426/646, 647, 656, 657, 802, 652, 74, 648, 262, 264, 331, 332, 281, 265

[56] References Cited

U.S. PATENT DOCUMENTS

| | | |
|---|---|---|
| Re. 30,023 | 6/1979 | Hawley et al. ................. 426/643 X |
| 2,442,663 | 6/1948 | Rinehart . |
| 2,513,094 | 1/1950 | Hall .................................... 426/264 |
| 2,957,770 | 10/1960 | Freund et al. . |
| 3,235,386 | 2/1966 | Mykleby . |
| 3,269,843 | 8/1966 | McKee et al. . |
| 3,552,978 | 1/1971 | Inklaar ............................ 426/641 X |
| 3,573,063 | 3/1971 | Williams . |
| 3,930,056 | 12/1975 | Feminella et al. ............... 426/641 X |
| 3,989,851 | 11/1976 | Hawley et al. .................. 426/643 X |
| 4,075,357 | 2/1978 | Seczesniak et al. ............. 426/644 X |
| 4,132,809 | 1/1979 | Desrosier ........................ 426/641 X |
| 4,161,552 | 7/1979 | Melachouris ................... 426/583 X |
| 4,164,589 | 8/1979 | Kadane et al. .................. 426/652 X |
| 4,168,322 | 9/1979 | Buckley et al. ................. 426/641 X |
| 4,259,363 | 3/1981 | Lauck et al. .................... 426/583 X |

FOREIGN PATENT DOCUMENTS

1266622 4/1968 Fed. Rep. of Germany .
2088367 1/1972 France .
6705069 10/1968 Netherlands .

OTHER PUBLICATIONS

Webb et al., *Byproducts from Milk*, 2nd ed. 1970, p. 104.
"Dairy-Based Ingredients—Their Expanding Role in Non-Dairy Processed Foods", Food Processing, 10/77, pp. 40-43.
Lauck, "The Functionality of Binders in Meat Emulsions", Journal of Food Science, 40 (1975), pp. 736-740.
Durand et al., "The Detection of Casein in Brines Injected into Cooked Hams", Rec. Med. Vit. 147 (8), 1971, pp. 853-858.
Hermansson et al., "Functional Properties of Added Proteins Correlated with Properties of Meat Systems", Journal of Food Science, vol. 40, 1975, pp. 595-614.
Chem. Abstracts: 64, 1262f (1966); 71, 122535q (1964); 75, 87157b (1971); 81, 48664u and 48668y (1974); 84, 88153v (1976).
Chem. Abstracts: 85, 4007k (1976); 85, 107596f (1976); 86, 41864d (1976); 81, 118697h (1974); 82, 71745a (1975).
Leistner, *German Sausage*, Die Fleischwirtschaft, No. 6/1978.
*ENRPRO 50 Whey Protein Concentrate*, Stauffer Chemical Co., 6/79, pp. 1-3.
*Whey Proteins & Modern Food Processing*, Stauffer Chemical Co., 6/77, pp. 1-26.

*Primary Examiner*—Arthur L. Corbin
*Attorney, Agent, or Firm*—Cushman, Darby & Cushman

[57] ABSTRACT

Protein fortified cured meat comprising cured intact skeletal meat muscle tissue having incorporated therein a whey protein composition having more than about 30% by weight whey protein on a dry solids basis and processes for preparation of the same.

26 Claims, No Drawings

WHEY PROTEIN FORTIFIED CURED MEAT AND PROCESS FOR PREPARATION

This application is a continuation-in-part of Ser. No. 108,734, filed Dec. 31, 1979, now abandoned.

The present invention relates to protein fortification of cured meat.

Meat such as pork is presently cured with brine solutions which contain molecularly dehydrated polyphosphates having a $Na_2O:P_2O_5$ ratio of 0.9-1 to 2.0-1, such as sodium tripolyphosphate, to improve structure, color and juice retention especially when heated (Hall, U.S. Pat. No. 2,513,094). This treatment has as its function the improvement of the physical characteristics of the meat but is not intended to add nutrition to the meat.

It is known to incorporate pure, naturally occurring amino acids and mixtures of amino acids derived by hydrolysis of proteins into cure solutions in order to overcome taste and flavor problems (see U.S. Pat. No. 3,552,978). The purpose of this treatment is the improvement of the physical characteristics of the meat. The amount of amino acids or hydrolyzed protein utilized is limited by the off-flavor that excessive amounts of amino acids can contribute to the system.

While numerous disclosures exist for the fortification of ground or minced meat with protein from various animal or vegetable sources, the attempts at protein fortification of cured skeletal meat are few. In May of 1976, the U.S.D.A. issued an interim regulation (since rescinded) allowing for the use of "non-meat proteins" such as isolated soy protein, wheat protein concentrate, yeast, NFDM and dried whey in meat products provided that certain vitamin and mineral requirements are satisfied and that the finished product contains a minimum protein content of 17% and a maximum moisture:protein ratio of 4:1. Isolated soy protein has generally been suggested for such use but widespread acceptance of the system has not occurred.

In past attempts to extend the protein content of cured meat with soy protein, it was found that soy protein isolate could only be used to provide a 6% improvement in protein content for hams pumped only up to 121% of their green weight. Only stitch pumping could be used since the solutions clogged the needles preventing artery and vein pumping. (Central Institute for Nutrition and Food Research in Brussels, Belgium, August 1966, Report R.2239).

Hawley et al., U.S. Pat. No. 3,989,851, after stating that the pumping of the solution described in Central Institute Report R.2239 above 140% caused protein separation, disclosed that these difficulties could be overcome even when pumping in excess of 140% green weight by the use of a curing medium prepared by hydrating a non-fibrous protein isolate substantially free of carbohydrates such as soy isolate, and then admixing the curing salts with the hydrated protein. Hawley et al. states that the soy-containing curing medium can be stitch pumped as high as 140-165% green weight, and upon curing, forms a uniformly distributed meat-like gel.

The process of Hawley et al. has not been commercialized to any great extent. Since it is imperative that the soy isolate be fully hydrated using nearly all of the water designated for the curing medium (Ralston-Purina Brochure for SUPRO ® 640 T, Fortiblend ™), dry cure ingredients must be used preventing the use of phosphate solutions or brine solutions. Special equipment is required to properly prepare the curing solution. The brine cannot be artery pumped since the colloidal particles of protein in suspension are larger than the inside of the capillaries. Artery pumping of the solution can cause capillaries to burst resulting in low yields and under cured areas of the meat due to insufficient cure distribution. Because of the high viscosity of the curing solution caused by the protein, a tendency toward pocketing of the solution in the seam and seam fat areas of a ham has been reported (ibid, Ralston-Purina). Since this results in an undesirable appearance, it has been recommended to bone and defat the ham (ibid, Ralston-Purina). The hams must be massaged or tumbled to insure distribution and equalization of the curing medium throughout the ham.

As stated in the Ralston-Purina brochure (ibid) because of the increased viscosity and resultant difficulty in pumping when the water to protein ratio falls below 8:1 (at above 145% pump), it becomes necessary to add dry protein to the massager in order to meet the 17% minimum protein and the moisture to protein ratio of 4:1 requirements as set by the U.S.D.A. For instance, at 150% and 155% pump approximately 0.825% protein based on the weight of the pumped meat is added.

Even using the process of Hawley et al., it has been found that soy protein isolate has disadvantages for use in cured meats. Hams pumped to 140% green weight show definite yellow tinges or spots of yellow throughout the muscle meat. Protein coagulates as yellowish-brown, grainy patches in the fat and on the exterior surface of the hams. The hams also take on a characteristic "beany" taste. For these reasons, commercial demand for this system has been limited.

Central Soya has developed a "pumping isolate" based on soy which is stated to meet government requirements. The product, which is prepared by an "exclusive manufacturing process", has about 90% protein and is advocated as:

(a) not requiring special mixing equipment or procedure;
(b) mixable with phosphate or brine solutions;
(c) providing a low viscosity solution not requiring larger pumps and needles; and
(d) not presenting any flavor problems (Central Soya Sales Brochure).

In order to be effective, the soy protein must be specially manufactured to avoid the problems normally associated with the use of soy isolate in pumping meat. However, even with the special manufacturing conditions, the beany off-flavor of soy still remains a problem.

Since the price of cured meat has increased significantly and since the quantities per consumer are less, the extension of the meat with a lower cost protein of high nutritional value is finding economic impetus. More commercial interest is being directed to the area of protein extended cured meat which product is termed a "combination meat product", i.e., combination ham. However, such products will not become commercially feasible unless the fortification can be accomplished while providing a product of good color, texture, appearance and taste. Government clearance of the products have heretofore required that the protein content of the final extended meat product be about equal to or greater than the protein content of the original meat. This would require that the protein fortifier be added in a large enough quantity to provide the necessary protein while not significantly affecting the color, taste, appearance, and texture of the meat.

THE INVENTION

In accordance with the present invention, there is provided protein fortified cured meat characterized by good flavor, color, appearance and texture by incorporating into intact skeletal meat muscle tissue a curing composition and a whey protein concentrate based protein extender. Optionally, the cure can contain cure accelerators such as erythorbic acid, ascorbic acid or their salts, a protein modifier such as an alkali metal polyphosphate, flavor enhancers and if desired, a small amount of another protein-containing composition. The extended meat as provided by the invention avoids the problems normally encountered in extending cured meat such as ham with soy protein. The protein used in the present invention can be hydrated any time prior to use. The extended cured meat of the invention does not exhibit undesirable coloring or unsightly protein coagulation within or on the meat. Good flavor, color and texture of the product are achieved. The characteristic beany taste of soy is not present.

Hams extended in this manner are characterized by good color even after storage, no observable build-up of protein pockets and no beany taste. The whey protein concentrate based extender can be hydrated before or after formation of the curing medium, can be artery pumped up to 135% and stitch pumped in amounts above 150%. Proper protein and moisture/protein ratios as dictated by the government for the type of product can be easily met.

DETAILED DESCRIPTION OF THE PRESENT INVENTION

As used herein, the term "cured" is intended to include the application of brine or other curing compositions in liquid form to the interior and/or the exterior of the meat. The term "cured" is also intended to cover dry-cured products to the extent that the meat is injected with a protein solution before or after curing or to the extent that the whey protein material can be taken up from a dry cure.

As used herein, the term "cured meat" is intended to include the non-comminuted red meats such as beef, pork, veal, lamb or mutton, wild meats such as venison as well as intact poultry such as chicken, turkey, geese, capon, Cornish hens, squab, duck, guinea fowl and pheasants, which are cured by chemical means such as salt (NaCl) and/or sodium nitrite.

As used herein, the term "intact skeletal meat muscle tissue" is intended to mean that the meat is in a state recognizable as meat muscle tissue. Thus, the meat muscle tissue and muscle fiber bundles which makes up the meat are as in the natural animal. Intact is not intended to include comminuted meats where the muscle tissue has been so reduced in size as to destroy the integrity of the muscle fiber bundles. Intact meat is also intended to cover pieces of meat which have been reduced in size from that of the original source to a size wherein the reduction has not been such that the muscle fiber bundles have been destroyed and wherein the size is sufficiently large to allow incorporation of the protein fortifier. Generally, meat reduced to a particle size wherein the smallest of any dimension of the particle (length, width, depth, or diameter) is ½" or above is usable in the invention.

As used herein the term "incorporating" is intended to mean inserting the whey protein fortified composition into the muscle tissue in the natural fiber bundle spaces.

The protein extender for use in the present invention comprises 75-100% of a whey protein concentrate and from 25-0% of another protein containing source. The protein must be hydratable so that it can be incorporated (injected) into the meat. The whey protein concentrate is required to have a minimum of about 30% by weight whey protein on a dry solids basis with the remainder of the composition being lactose and ash. The optional protein source can be either animal or vegetable and can be derived from dairy sources such as milk or whey or vegetable sources such as soy. When using soy protein as the optional protein source, care must be taken to insure that the soy protein is properly hydrated if necessary prior to dissolution of the salt and phosphates in the curing medium. Limited amounts of soy protein should be used to avoid a "beany" taste.

The whey protein concentrate used in the present invention can be derived from either acid whey or sweet whey as desired. Acid or cottage cheese whey is the by-product obtained from the acid coagulation of milk protein by the use of a lactic acid producing bacteria (e.g., lactobacillus) or by the addition of food grade acids such as lactic or hydrochloric acid, i.e., by direct acidification.

The whey can also be derived from the production of cheddar cheese which is commonly produced by the rennet coagulation of protein. This cheese whey is commonly called "sweet" or "cheddar cheese whey". Whey from the manufacture of other cheeses can also be used.

The whey protein concentrate as used in the present invention is most preferably derived from 100% acid cheese whey though minor amounts of other cheese wheys of up to 50% and preferably less than 20% can be used in the preferred form.

The whey protein concentrate must be hydratable under the conditions of the curing solution. Otherwise, the material cannot be incorporated (injected) into the meat. Processes which can be utilized to prepare whey protein concentrate in a hydratable form include electrodialysis (Stribley, R. C., Food Processing, Volume 24, No. 1, p. 49, 1963), Reverse Osmosis, Marshall, P. G. et al., Fractionation and Concentration of Whey by Reverse Osmosis, Food Technology 22(a) 696, 1968, Gel Filtration (U.S. Pat. No. Re. 27,806), or Ultrafiltration, Horton, B. S. et al., Food Technology, Volume 26, p. 30, 1972. Chemical methods such as phosphate precipitation as described in Gordon U.S. Pat. No. 2,388,624 and Melachouris U.S. Pat. No. 4,043,990 can be used if the products obtained from those chemical precipitation methods are hydratable under the conditions of the curing medium, i.e., pickle.

It has been found that the most effective results have been obtained using an ultrafiltered acid (cottage cheese) whey protein concentrate containing at least about 40% whey protein. In a typical process, cottage cheese whey is neutralized to a pH of about 6.4 with 50% caustic. After storage, the pH is then adjusted to about 7.2 and any solids or precipitates are removed by centrifugal clarification. The clarified liquor is then pasteurized. The liquor is then fed into an ultrafiltration membrane unit. The retentate is condensed and spray dried. Protein products of 35% or more whey protein can be prepared by this process. One of the more preferred products prepared by the process generally comprises from about 40% to about 60% protein based on total Kjeldahl nitrogen, 10-30% lactose, 3-15% ash and 0.1-4% fat. It is preferred to use a product in the dry form to avoid the need for refrigeration though the liquid whey protein concentrate can also be used. As used herein, the term "whey protein concentrate" is also intended to include any of the products prepared by other methods which have a whey protein concentration of at least 30% and the composition is hydratable under the conditions of the curing medium.

It is pointed out that the processes for preparing the whey protein concentrate are required to be such that all of the ingredients in the whey protein concentrate are hydratable under the conditions of the curing medium. This requires that the protein be substantially undenatured or that the lactose salts or any other material in the composition not cause any dissolution problems.

In addition to the whey protein concentrate, the curing medium can also include from about 25% to about 0% of another protein containing composition preferably based on dairy products such as NFDM, dried whey, delactosed whey, delactosed demineralized whey where demineralization is accomplished by any known method such as electrodialysis.

The whey protein concentrate can be dissolved in water and have the remainder of the curing ingredients added or the whey protein concentrate can be added to the phosphate solution or brine. The whey protein concentrate is easily hydratable in either instance.

The treatment solution can contain just the protein or protein and additional curing compositions such as curing salts, i.e., sodium chloride, sodium nitrate, and sodium nitrite; protein modifiers, i.e., mono, di and trialkali metal orthophosphates such as monosodium phosphate and disodium phosphate, alkali metal tripolyphosphates such as sodium tripolyphosphate, alkali metal pyrophosphates such as tetrasodium pyrophosphate and sodium acid pyrophosphate, alkali metal polyphosphates such as sodium hexametaphosphate, and mixtures thereof and the like as well as sodium hydroxide/phosphate blends (i.e., four parts phosphate per part sodium hydroxide) and their potassium homologues; cure accelerators, i.e., ascorbic acid, erythorbic acid, their sodium and potassium salts, and mixtures as well as blends thereof with up to 50% citric acid or sodium citrate; flavoring ingredients, i.e., sugar, dextrose, brown sugar, spices, spice extracts, hydrolyzed vegetable protein, and artificial or liquid smoke; flavor enhancers, i.e., monosodium glutamate, hydrolyzed vegetable protein; proteolytic enzymes for softening beef tissue and carbonates and bicarbonates of alkali metals, such as sodium, in an amount sufficient to stabilize sodium erythorbate and sodium nitrite solution to pH 5.6 at pickle temperature of about 5° C. The amount and type of curing materials will depend on the type of meat cured and the cure normally used by that manufacturer. While these blends vary from meat processor to meat processor, a typical curing formulation will contain from about 0.5% to 16% and preferably from about 7% to about 14% protein, from about 3% to about 20% and preferably from about 4% to about 7% NaCl, from about 1.5% to about 20% and preferably from about 2% to about 4% sugar, from about 0.4% to about 0.15% and preferably from about 0.04% to about 0.07% sodium nitrite, from about 0% to about 0.2% sodium nitrate, from about 0.1% to about 0.5% and preferably from about 0.1% to about 0.2% sodium erythorbate, and from about 0.7% to about 5.0% and preferably from about 0.8% to about 1.5% molecularly dehydrated phosphate such as sodium tripolyphosphate. Preferably, the cure contains from about 9% to about 12.5% protein. These percentages are by weight based on the total weight of the curing medium. Other curing compositions are in the realm of one skilled in the art.

The curing solutions for use in the present invention can be prepared by hydrating the protein first or by adding the protein to a phosphate and/or brine solution. No particular blending problem has been encountered. Good manufacturing technique is used to insure that the materials are thoroughly admixed to uniform cure.

The meats which can be protein fortified in accordance with the invention include pork derived meats such as hams, pork shoulders, picnics, loins, butts, and bacon; beef derived meats such as round or brisket (peppered beef round, pastrami, tongue, corned beef, brisket or round) and beef bacon; and, to a lesser extent, lamb, veal and wild animal such as deer. The meat can be sold in larger pieces such as a whole ham, or smaller pieces such as corned beef, in whole or sliced form, or in any form particular to that meat such as whole hams, boned hams, oval hams, pear-shaped hams, canned, boiled, smoked or dried. The solid meat can also be a formed product known as sectioned and formed. Sectioned and formed is intended to be limited to large intact meat products prepared from smaller, intact pieces and is not intended to cover comminuted meat. The meat can be boned if desired though this is not essential.

The cured poultry meat preferably from chicken or turkey or mixtures thereof which can be fortified in accordance with the present invention can be in the form of whole poultry or poultry parts. Poultry parts include whole breast, fillets, sectioned and formed, rolled, and the like. The protein fortification can be applied to poultry destined for any normal cured poultry. The cost of the whey protein versus the cost of the cured poultry will generally dictate the area of use. The protein fortified curing solution can be incorporated in the intact muscle tissue, ie., inserted in the muscle tissue in the natural fiber bundle spaces using any known means for that purpose such as artery pumping, vein pumping, injection, stitch pumping, osmosis curing (with or without pumping) topical high pressure injection, absorption in combination with massaging and combinations thereof. The preferred incorporation methods include stitch pumping, vein pumping, artery pumping, injection and combinations thereof. The proper technique utilized will be governed by the meat and the process used by the meat processor. Preferably, the pumped meat is massaged or tumbled after pumping to insure even distribution of the cure. Cure solution, whey protein solution or purge from the pumped meat can be present during massaging to allow additional cure solution to be absorbed during massaging. The meat is preferably trimmed of surface fat to assist in reabsorbing of fluid during massaging. Massaging is preferably carried out for a period of time ranging from about two hours to about eight hours though the massaging can be carried out for longer periods without disadvantageous effects.

It is also within the scope of the invention to pump the meat with the protein and then separately with the cure or vice versa, i.e., applying a solution of protein extenders to the meat after the meat has been contacted with a curing solution and before heating. It is also contemplated with the scope of the invention to simultaneously incorporate (inject) with solutions of protein and cure. Each of these methods provides a meat which is protein fortified in the presence of a cure. These procedures can be accomplished at any time prior to smoking or cooking.

No limits are known for the amount of protein fortified cure that can be pumped. Cure solutions containing 14% protein can be pumped as high as 160% of green weight. The preferable limits to the amount of protein added are the governmental limits which for meat are at least 17% protein and a moisture to protein ratio of 4 to 1. It is preferred that the final product contain at least 1% supplemental protein (on a dry basis) as added by the fortifier, the percentage being based on the final weight of the fortified product. A protein-fortified meat composition can contain, for example, from about 60% to about 80% natural intact muscle, from about 20% to about 40% curing composition and from about 2% to about 15% on a dry basis of a whey protein fortifier composition containing from about 75% to about 100% whey protein concentrate and from about 25% to 0% of another protein.

The meat products can then be processed by standard industry techniques including those necessary to meet governmental regulations. Pork must be held at a temperature not above 4.5° C. for 30 days to be certified free of trichinosis or cooked to an internal temperature of at least 56.1° C. Pork is usually smoked at above these temperatures for the final product. Beef such as corned beef is sold refrigerated and uncooked.

It is also considered with the scope of the invention to inject a whey protein concentrate extender into cured meat which is already cooked (smoked). While cooking to a high enough temperature will coagulate the whey protein, it is not required that the whey protein form an irreversible gel upon heating. Therefore, unheated whey protein solutions may be injected into cooked meat as an extender for a ready-to-eat product. The results obtained for cooked and uncooked would be similar.

The product of the present invention is a protein-fortified cured meat characterized by good flavor, color, texture and taste. It is not essential to add the protein to the curing solution in any set order nor is it necessary that the protein form an irreversible gel. Equivalent results are obtained from cooked and uncooked meats as well as from boned or unboned meats.

The invention is further illustrated in the examples which follow.

EXAMPLES 1-12

Bone-less (Examples 1-9), and bone-in (Examples 10-12) hams were extended with a whey protein concentrate containing about 50% whey protein using the following pickle formulations which were used in an attempt to obtain the listed percent pump level:

TABLE I

| Formulation | A | B | C |
|---|---|---|---|
| Ideal Percent Pump Level | 115* | 125* | 140* |
| Ingredients (Percent) | | | |
| Whey Protein Concentrate | 16.7 | 10 | 6.25 |
| Salt | 13.3 | 8 | 5 |
| Blend 90% STP/10% SHMP | 2.7 | 1.6 | 1 |
| Sodium Erythorbate | 0.37 | 0.22 | 0.14 |
| Sodium Nitrite | 0.08 | 0.048 | 0.03 |

TABLE I-continued

| Formulation | A | B | C |
|---|---|---|---|
| Water | 66.9 | 80.1 | 87.6 |

*Final expected yield weight based on a starting weight of 100% for the meat.

The whey protein concentrate was added to a pickle formed by dissolving the remaining ingredients in the water. The whey protein concentrate was readily hydrated using a Lightnin TM mixer. The bone-less hams were cut open to lay flat and were injected with 1 to 4 passes through a commercial multiple needle stitch injector or by manual stitch injection. Two of the bone-in hams were artery injected and one was stitch injected. The hams were stored at 1.67° C. and then massaged by tumbling in a modified cement-type mixer at 4 RPM for 1 to 22 hours as set forth in Table II below:

TABLE II

| Example | Ham Type | Pump Method | Solution Concentration % Pump Theory | % Pump After Injection | Massage Time (hours) |
|---|---|---|---|---|---|
| 1 | Bone-less | Manual Stitch | 115 | 109 | 1 |
| 2 | Bone-less | Commercial Stitch (2 Passes) | 125 | 110 | 1 |
| 3 | Bone-less | Commercial Stitch (4 Passes) | 140 | 129 | 1 |
| 4 | Bone-less | Manual Stitch | 115 | 120 | 22 |
| 5 | Bone-less | Manual Stitch | 115 | 111 | 4 |
| 6 | Bone-less | Commercial Stitch (2 Passes) | 125 | 119 | 4 |
| 7 | Bone-less | Commercial Stitch (3 Passes) | 125 | 129 | 22 |
| 8 | Bone-less | Commerical Stitch (4 Passes) | 140 | 129 | 4 |
| 9 | Bone-less | Commercial Stitch (4 Passes) | 140 | 133 | 22 |
| 10 | Bone-In | Artery | 125 | 108 | 16.5 |
| 11 | Bone-In | Artery | 140 | 111 | 16.5 |
| 12 | Bone-in | Manual Stitch | 115 | 123 | 16.5 |

The hams of Examples 1-3 were stuffed into molds and autoclave-cooked as boiled hams. The remaining hams (Examples 4-12) were stuffed into stockinettes and cooked in the smokehouse to an internal temperature of 66.7° C. for bone-in and 71.7° C. for bone-less hams according to the following schedule:

TABLE III

| SMOKEHOUSE TEMPERATURE SCHEDULE | | | |
|---|---|---|---|
| Time (Min.) | Dry Bulb (°C.) | Wet Bulb (°C.) | Smoke |
| 30 | 54.4 | — | — |
| 45 | 54.4 | — | Smoke on |
| 60 | 65.5 | 54.4 | — |
| 60 | 71.1 | 60 | — |
| To Desired Internal Temperature | 776.6 | 65.5 | |

The cooking results are reported in Table IV below:

TABLE IV

| Example | % Pump After Injection | % Cooked Yield | % Protein | % Moisture | % Salt | Moisture/Protein Rates |
|---|---|---|---|---|---|---|
| 1 | 109 | 88 | 22.6 | 64.4 | 1.5 | 2.8 |
| 2 | 110 | 86 | 21.2 | 67.3 | 1.4 | 3.2 |
| 3 | 129 | 102 | 18.6 | 69.2 | 2.0 | 3.7 |
| 4 | 120 | 98 | 22.2 | 67.0 | 2.7 | 3.0 |
| 5 | 111 | 96 | 22.2 | 63.6 | 2.1 | 2.9 |
| 6 | 119 | 100 | 21.2 | 64.5 | 2.3 | 3.0 |
| 7 | 129 | 105 | 20.3 | 68.6 | 2.6 | 3.4 |
| 8 | 129 | 105 | 19.8 | 68.1 | 2.4 | 3.4 |
| 9 | 133 | 106 | 19.2 | 70.2 | 2.4 | 3.7 |
| 10 | 108 | 93 | 22.6 | 70.5 | 1.2 | 3.1 |
| 11 | 111 | 96 | 21.3 | 69.2 | 1.3 | 32. |
| 12 | 123 | 99 | 21.2 | 69.7 | 1.5 | 3.3 |

EXAMPLES 13-24

Various extended hams were prepared using whey protein concentrate against controls of soy protein isolate or no additive. The hams were prepared as described below using the following formulations (Tables V and VI).

TABLE V

| Formulation | D | E | F | G | H |
|---|---|---|---|---|---|
| Ideal % Pump Level | 130 | 140 | 150 | 140 | 150 |
| Ingredients (Percent) | | | | | |
| Whey Protein Concentrate (50% protein) | 14 | 19 | 22 | — | — |
| Soy Protein Isolate* | — | — | — | 10.1 | 10.0 |
| Salt (NaCl) | 7.15 | 5.8 | 4.95 | 5.8 | 4.95 |
| 90% STP/10% SHMP | 1.73 | 1.4 | 1.2 | 1.4 | 1.2 |
| Sodium Erythorbate | 0.217 | 0.18 | 0.15 | 0.18 | 0.15 |
| Sodium Nitrite | 0.0676 | 0.055 | 0.0468 | 0.055 | 0.0468 |
| Sugar | 3.6 | 2.9 | 2.5 | 2.9 | 2.5 |
| Water** | 73.3 | 70.7 | 69.1 | 79.6 | 81.1 |

*Profam ™, Grain Processing Company
**Water to soy ratio must be 8/1 to dissolve soy (500 grams dry soy to massage for each 68 kilograms of pumped meat).

TABLE VI

| Formulation | I | J (No Additive Control) | K (No Additive Control) |
|---|---|---|---|
| Ideal % Pump Level | 150 | 140 | 150 |
| Ingredients (Percent) | | | |
| Whey Protein Concentrate (90% Protein) | 12.2 | — | — |
| Salt (NaCl) | 4.95 | 5.8 | 5.0 |
| 90% STP/10% SHMP | 1.2 | 1.4 | 1.2 |
| Sodium Erythorbate | 0.15 | 0.18 | 0.15 |
| Sodium Nitrite | 0.0468 | 0.055 | 0.0468 |
| Sugar | 2.5 | 2.9 | 2.5 |
| Water | 79.0 | 89.7 | 91.2 |

The soy isolate was completely hydrated by agitating the same with the water. The remaining ingredients of the pickle were then dissolved in the aqueous solution.

The whey protein concentrate (50% or 90%) was added to the water simultaneously with the other ingredients of the pickle and readily hydrated.

All hams were stitch pumped manually within the solutions noted in Tables V and VI. Artery pumping of soy pickle was attempted on a bone-in ham but the soy protein clogged the arteries. This method was abandoned. The hams were massaged as in Example 1 for 2 to 22 hours and then smoked using the schedule of Table III until an internal temperature of 60° C. was reached. Examples 13-16 prepared bone-in hams smoked in stockinettes. Examples 17-24 prepared boneless hams cooked in casings. The pumping data and cooking data are reported in Tables VII and VIII respectively:

TABLE VII

| EXAMPLE | SOLUTION (FORMULATION) | CONCENTRATE % OF GREEN WEIGHT | % PUMP AFTER INJECTION | % DRAINED PUMP* | MASSAGE TIME (HRS)** |
|---|---|---|---|---|---|
| 13 | Soy (I) | 150 | 146 | 142 | 8 |
| 14 | WPC-50% (F) | 150 | 153 | 135 | 2 |
| 15 | WPC-50% (F) | 150 | 150 | 127 | 8.25 |
| 16 | WPC-50% (F) | 150 | 150 | 130 | 22 |
| 17 | WPC-50% (F) | 150 | 150 | 134 | 4 |
| 18 | WPC-50% (F) | 150 | 149 | 123 | 2 |
| 19 | WPC-50% (F) | 150 | 144 | 129 | 8.25 |
| 20 | WPC-50% (F) | 150 | 143 | 129 | 22 |
| 21 | Soy (I) | 150 | 130 | 123 | 2 |
| 22 | Soy (I) | 150 | 147 | 136 | 22 |
| 23 | Soy (I) | 150 | 140 | 132 | 4 |
| 24 | Soy (I) | 150 | 147 | 137 | 8 |

*Measured just prior to cooking
**Massager run at 4 RPM'

TABLE VIII

| EXAMPLE | % DRAINED PUMP* | % COOKED YIELD | PROTEIN % | MOISTURE % | SALT % | MOISTURE PROTEIN RATES |
|---|---|---|---|---|---|---|
| 13 | 142 | 132 | 17.0 | 73.6 | 2.1 | 4.3 |
| 14 | 135 | 126 | 17.6 | 70.4 | 2.1 | 4.0 |
| 15 | 127 | 120 | 15.3 | 65.1 | 1.9 | 4.3 |
| 16 | 130 | 120 | 18.5 | 67.3 | 2.1 | 3.6 |
| 17 | 134 | 120 | 18.8 | 68 | 2.5 | 3.6 |
| 18 | 123 | 112 | 17.9 | 66.3 | 1.9 | 3.7 |
| 19 | 129 | 116 | 20.1 | 70.1 | 2.1 | 3.5 |
| 20 | 129 | 115 | 19.8 | 68.0 | 2.3 | 3.4 |
| 21 | 123 | 107 | 19.4 | 70.4 | 1.6 | 3.6 |
| 22 | 136 | 123 | 17.2 | 73.0 | 2.1 | 4.2 |
| 23 | 132 | 117 | 18.5 | 69.1 | 1.9 | 3.7 |
| 24 | 137 | 120 | 18.8 | 72.9 | 2.2 | 3.9 |

*Measured just prior to cooking

EXAMPLES 25–36

A series of pickles was prepared using the formulae from Tables V and VI. All hams were pumped by manual stitch pump. During pumping the 150% pickle containing whey protein concentrate coagulated and clogged the pump. This pickle was not prechilled and heat buildup in the pump due to high pressure was considerable.

All hams were massaged for 4 hours at 4 RPM, stored at 1.67° C. and then smoked. The hams used in Examples 24–35 were bone-less, and those used in 35 and 36 were bone-in.

TABLE IX

| EXAMPLE | SOLUTION (FORMULATION) | CONCENTRATION % | % PUMP AFTER INJECTION | % DRAINED PUMP* | COOK METHOD |
|---|---|---|---|---|---|
| 25 | Soy Isolate (G) | 140 | 131 | 125 | Stocking |
| 26 | Soy Isolate (G) | 140 | 123 | 118 | Casing |
| 27 | Soy Isolate (H) | 150 | 137 | 131 | Stocking |
| 28 | Soy Isolate (H) | 150 | 122 | 116 | Casing |
| 29 | WPC-50% (E) 140 | 140 | 135 | 123 | Stocking |
| 30 | WPC-50% (E) 140 | 140 | 129 | 118 | Casing |
| 31 | WPC-50% (F) 150 | 150 | 145 | 127 | Stocking |
| 32 | WPC-50% (F) 150 | 150 | 146 | 120 | Casing |
| 33 | Control (J) 140 | 140 | 142 | 126 | Stocking |
| 34 | Control (K) 150 | 150 | 152 | 135 | Casing |
| 35 | WPC-50% (F) 150 | 150 | 156 | 139 | Stocking |
| 36 | WPC-50% (E) 140 | 140 | 152 | 130 | Stocking |

*Measured just prior to cooking

| EXAMPLE | % DRAINED PUMP % | % COOK YIELD | % PROTEIN | % MOISTURE | % SALT | MOISTURE/ PROTEIN RATIO |
|---|---|---|---|---|---|---|
| 25 | 125 | 109 | 18.1 | 70.7 | 1.6 | 3.9 |
| 26 | 118 | 96 | 17.9 | 66.3 | 1.5 | 3.7 |
| 27 | 131 | 114 | 18.5 | 68.2 | 1.3 | 3.7 |
| 28 | 116 | 102 | 21.2 | 69.1 | 1.0 | 3.3 |
| 29 | 123 | 107 | 19.6 | 69.3 | 2.2 | 3.5 |
| 30 | 118 | 104 | 20.6 | 68.9 | 1.7 | 3.3 |
| 31 | 127 | 110 | 18.8 | 65.2 | 2.0 | 3.4 |
| 32 | 120 | 105 | 19.5 | 66.5 | 2.0 | 3.4 |
| 33 | 126 | 106 | 16.0 | 70.7 | 1.5 | 4.4 |
| 34 | 135 | 115 | 14.0 | 68.2 | 1.7 | 4.9 |
| 35 | 139 | 127 | 16.0 | 67.5 | 2.0 | 4.2 |
| 36 | 130 | 119 | 17.7 | 65.8 | 1.9 | 3.7 |

EXAMPLES 37–46

Hams were pumped at a commercial establishment with pickles containing 50% whey protein concentrate or 90% whey protein concentrate and compared to hams pumped in the laboratory with pickles containing soy isolate. Some of the hams were sectioned and trimmed of all visible fat prior to reforming and injection.

All hams were tumbled at 16 RPM, stored, stuffed into casings and cooked. The hams of Examples 39, 41, 44 and 46 were tumbled two hours, the remainder at four hours. One ham from each pumping was placed in a spring mold prior to cooking. The internal temperature of the cooked bone-in hams was 65.5° C. and of the bone-less was 75.5° C.

The formulations used are shown in Tables V and VI. The yields are reported in Table X. Examples 37 and 38 were artery and stitch pumped while the remainder were stitch pumped.

TABLE X

| EXAMPLE | HAM-TYPE | SOLUTION (FORMULATION) | CONCENTRATION | % PUMP PRE-MASSAGE | % DRAINED PUMP* | COOK METHOD |
|---|---|---|---|---|---|---|
| 37 | Bone-In | 50% WPC (F) | 150 | 139 | 138 | Stockinette |
| 38 | Bone-In | 90% WPC (I) | 150 | 144 | 143 | Stockinette |
| 39 | Boneless | 50% WPC (F) | 150 | 126 | 127 | Casing No Mold |
| 40 | Boneless | 50% WPC (F) | 150 | 125 | 138 | Casing Mold |
| 41 | Boneless | 50% WPC (F) | 150 | 120 | 120 | Casing No Mold |
| 42 | Boneless | 90% WPC (I) | 150 | 129 | 128 | Casing Mold |
| 43 | Sectioned and Formed | 50% WPC (F) | 150 | 122 | — | Casing Mold |
| 44 | Sectioned and formed | 50% WPC (F) | 150 | 100 | 132 | Casing No Mold |
| 45 | Sectioned and Formed | Soy (H) | 150 | 142 | 158 | Casing Mold |
| 46 | Sectioned and Formed | Soy (H) | 150 | 131 | 154 | Casing No Mold |

*Measured just prior to cooking.

TABLE XI

| EXAMPLE | % DRAINED PUMP | % COOK YIELD | % PROTEIN | % MOISTURE | % SALT | MOISTURE/PROTEIN RATIO |
|---|---|---|---|---|---|---|
| 37 | 138 | 125 | 17.7 | 64.0 | 2.03 | 3.62 |
| 38 | 143 | 130 | 14.7 | 68.8 | 1.97 | 4.68 |
| 39 | 127 | 102 | 19.7 | 64.8 | 1.77 | 3.29 |
| 40 | 138 | 112 | 16.0 | 68.3 | 2.16 | 4.27 |
| 41 | 120 | 97 | 19.8 | 63.7 | 1.68 | 3.21 |
| 42 | 128 | 101 | 19.1 | 65.5 | 2.02 | 3.43 |
| 43 | — | 108 | 20.0 | 67.6 | 1.90 | 3.38 |
| 44 | 132 | 114 | 19.3 | 68.0 | 1.87 | 3.52 |
| 45 | 158 | 131 | 18.2 | 72.2 | 2.89 | 3.97 |
| 46 | 154 | 128 | 17.3 | 73.3 | 2.94 | 4.24 |

Hams from these examples were tasted informally. The tasters consistently agreed that the hams containing the whey protein concentrate had better flavor, color and appearance as compared to the hams pumped with a soy protein-containing pickle. The whey protein containing hams had better texture than the control hams.

Soy protein-containing hams have the advantage that they retain the pump liquid during storage somewhat better than whey protein concentrate containing hams probably due to the fact that the soy solutions are more viscous. This advantage provides an equally important disadvantage. Soy protein containing pickles cannot be artery pumped because the high viscosity clogs the needles.

Whey protein concentrate can be hydrated at any stage of the pickle preparation. Whey protein concentrate does not have to be dissolved first as required for the incorporation of soy protein into the pickle.

Pickles containing whey protein concentrate are less viscous and pumping is facilitated. These pickles can be artery pumped whereas pickles containing soy protein cannot.

Since good cook yield is related to retained pump, it is preferred that the whey protein concentrate-containing pickle be pumped to a high level and that the pumped meat receive vigorous tumbling or massage to obtain high cook yields.

What is claimed is:

1. A protein fortified cured meat, comprising cured intact skeletal meat muscle tissue as the sole cured meat source, having incorporated into the muscle tissue of said meat a whey protein composition having more than about 30% by weight whey protein on a dry solids basis wherein said whey protein composition consists essentially of about 100% of a whey protein concentrate as the sole protein source, wherein said whey protein concentrate is prepared by neutralizing whey prior to protein concentration, and wherein said whey protein concentrate is hydratable for incorporation into said meat.

2. The protein-fortified meat as recited in claim 1 which contains at least 1%, on a dry solids basis, of added whey protein, said percentage being based on the final weight of the fortified meat.

3. The protein-fortified meat as recited in claim 1 wherein said meat muscle tissue is pork.

4. The protein-fortified meat as recited in claim 1 wherein said whey protein composition is whey protein concentrate having from about 40% to about 60% whey protein.

5. The product as recited in claim 1 wherein said whey protein containing composition is whey protein concentrate.

6. A protein-fortified cured meat product comprising from about 60% to about 78% of intact natural skeletal meat muscle tissue as the sole meat source, from about 20% to about 38% of a curing composition, and from about 2% to about 15% on a dry basis of a whey protein composition incorporated into the muscle tissue, said whey protein composition consisting essentially of about 100% of a whey protein concentrate as the sole protein source, wherein said whey protein concentrate is prepared by neutralizing whey prior to protein concentration, and wherein said whey protein concentrate is hydratable for incorporation into said meat.

7. The product as recited in claim 6 wherein said meat muscle tissue is selected from the group consisting of beef, pork, veal and lamb.

8. The product as recited in claim 7 wherein said meat is pork.

9. The product as recited in claim 8 wherein said pork is selected from the group consisting of ham, bacon, picnics and butts.

10. The product as recited in claim 9 wherein said pork is ham.

11. The product as recited in claim 6 wherein said meat muscle tissue is poultry.

12. The product as recited in claim 6 which further includes a protein modifier agent.

13. The product as recited in claim 12 wherein said protein modifier agent is a phosphate selected from the group consisting of monoalkali metal phosphate, dialkali metal phosphate, trialkali metal phosphate, alkali metal acid pyrophosphate, alkali metal tripolyphosphate, alkali metal polyphosphates and mixtures thereof, said alkali metal being sodium or potassium.

14. The product as recited in claim 6 which further includes a cure accelerator selected from the group consisting of ascorbic acid, erythorbic acid, their salts and blends thereof with up to 50% citric acid or sodium citrate.

15. A process for preparing a protein-fortified cured meat comprising incorporating into intact skeletal meat muscle tissue, as the sole meat source, before, during or after curing, a hydrated whey protein composition having more than 30% by weight whey protein on a dry solids basis wherein said whey protein composition consists essentially of about 100% of a whey protein concentrate as the sole protein source, wherein said whey protein concentrate is prepared by neutralizing whey prior to protein concentration, and wherein said whey protein concentrate is hydratable for incorporation into said meat.

16. The process of claim 15 wherein said protein composition is an extender and is incorporated into said tissue in the presence of a curing composition.

17. The process as recited in claim 16 wherein said whey protein composition is incorporated into said tissue in the presence of said curing composition by a method selected from the group consisting of:
 (a) applying a solution of the protein composition extender to the meat before the meat has been contacted with a liquid cure;
 (b) applying a blend of the protein composition extender and said curing composition to said meat;
 (c) applying a solution of the protein composition extender to the meat after the meat has been contacted with a curing solution and before heating; and
 (d) applying a solution of the protein composition extender to the meat after the meat has been cured and cooked.

18. The process as recited in claim 17 wherein said protein composition is incorporated into said tissue in the presence of the curing composition by the use of a blend of a whey protein based extender hydrated in an aqueous curing solution.

19. The process as recited in claim 18 wherein said curing solution contains a curing salt and a protein modifier agent.

20. The process as recited in claim 19 wherein said protein modifier agent is selected from the group consisting of alkali metal orthophosphate, alkali metal pyrophosphate, alkali metal tripolyphosphate, alkali metal polyphosphates and mixtures thereof, said alkali metal being sodium or potassium.

21. The product of the process of claim 20.

22. The process as recited in claim 20 in which said curing solution further includes a cure accelerator selected from the group consisting of ascorbic acid, erythorbic acid, their salts and blends thereof with up to 50% citric acid or sodium citrate.

23. The product of the process of claim 22.

24. The process as recited in claim 15 wherein said meat is selected from the group consisting of beef and pork.

25. The process as recited in claim 15 wherein said meat is poultry.

26. The process as recited in claim 25 wherein said poultry is chicken or turkey or mixtures thereof.

* * * * *